United States Patent
Hashimoto et al.

(10) Patent No.: US 11,280,415 B2
(45) Date of Patent: Mar. 22, 2022

(54) VALVE DEVICE

(71) Applicant: DENSO CORPORATION, Kariya (JP)

(72) Inventors: Kouji Hashimoto, Kariya (JP); Masao Ino, Kariya (JP)

(73) Assignee: DENSO CORPORATION, Kariya (JP)

( * ) Notice: Subject to any disclaimer, the term of this patent is extended or adjusted under 35 U.S.C. 154(b) by 13 days.

(21) Appl. No.: 16/911,744

(22) Filed: Jun. 25, 2020

(65) Prior Publication Data
US 2020/0408311 A1 Dec. 31, 2020

(30) Foreign Application Priority Data

Jun. 27, 2019 (JP) .............................. JP2019-120186

(51) Int. Cl.
*F16K 11/076* (2006.01)

(52) U.S. Cl.
CPC .................................. *F16K 11/076* (2013.01)

(58) Field of Classification Search
CPC ........................ F16K 11/076; Y10T 137/86855
See application file for complete search history.

(56) References Cited

U.S. PATENT DOCUMENTS

| | | | | |
|---|---|---|---|---|
| 3,048,191 A | * | 8/1962 | Crang | F16K 5/0407 137/625.32 |
| 3,103,231 A | * | 9/1963 | Moen | E03C 1/023 137/454.2 |
| 4,655,252 A | * | 4/1987 | Krumhansl | F16K 11/0853 137/269 |
| 6,308,739 B1 | * | 10/2001 | Barbuto | F16K 5/0478 137/625.11 |
| 6,457,698 B2 | * | 10/2002 | Wichmann | F16K 11/076 251/108 |
| 6,994,316 B2 | * | 2/2006 | Pervaiz | F16K 5/0478 251/160 |
| 9,382,833 B2 | * | 7/2016 | Morein | F16K 11/165 |
| 9,500,299 B2 | * | 11/2016 | Morein | F16K 41/026 |
| 2011/0283880 A1 | * | 11/2011 | Okuma | F16J 15/3284 92/165 R |
| 2015/0027572 A1 | | 1/2015 | Morein et al. | |
| 2018/0258889 A1 | | 9/2018 | Ishigaki | |

\* cited by examiner

*Primary Examiner* — Kevin R Barss
(74) *Attorney, Agent, or Firm* — Nixon & Vanderhye P.C.

(57) ABSTRACT

A valve body has: a tubular portion, which is rotatably placed at an inside of a housing; and a partition wall which partitions an inside space of the tubular portion into a first valve chamber located on one axial side of the partition wall and a second valve chamber located on another axial side of the partition wall. A seal member is placed between an inner wall of the housing and the tubular portion of the valve body and extends in a circumferential direction. The seal member partitions an inside space of the housing into a first housing chamber, at which a first fluid inlet and a first fluid outlet of the housing are placed, and a second housing chamber, at which a second fluid inlet and a second fluid outlet of the housing are placed.

8 Claims, 7 Drawing Sheets

VALVE DEVICE

CROSS REFERENCE TO RELATED APPLICATIONS

This application is based on and incorporates herein by reference Japanese Patent Application No. 2019-120186 filed on Jun. 27, 2019.

TECHNICAL FIELD

The present disclosure relates to a valve device.

BACKGROUND

Previously, there is known a valve device configured to adjust flow rates of a plurality of fluid flows respectively conducted in a plurality of paths. One such a valve device has a first valve body, which adjusts a flow rate of a coolant flow, and a second valve body, which adjusts a flow rate of another coolant flow. The first valve body and the second valve body are separately joined to a shaft. Therefore, when the joint between the first valve body and the shaft or the joint between the second valve body and the shaft is loosen due to, for example, aging, a positional deviation may possibly occur between the first valve body and the second valve body in the rotational direction.

SUMMARY

This section provides a general summary of the disclosure, and is not a comprehensive disclosure of its full scope or all of its features.

According to the present disclosure, there is provided a valve device that includes a housing and a valve body. The valve body has a tubular portion, which is rotatably placed at an inside of the housing; and a partition wall, which partitions an inside space of the tubular portion into a first valve chamber located on one axial side of the partition wall and a second valve chamber located on another axial side of the partition wall.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Previously, there is known a valve device configured to adjust flow rates of a plurality of fluid flows respectively conducted in a plurality of paths.

One previously proposed valve device of this kind is configured to simultaneously adjust flow rates of coolant flows, which are respectively conducted in a plurality of paths and respectively have different temperatures. Specifically, this valve device is configured such that a first housing chamber, through which the coolant flow of a first path is conducted, and a second housing chamber, through which the coolant flow of a second path is conducted, are formed at an inside of the housing. The first housing chamber and the second housing chamber are partitioned by a partition wall that is formed at the inside of the housing. A shaft, which extends through the partition wall, is installed at the housing such that the shaft is rotatable about an axis of the shaft. A first valve body, which adjusts the flow rate of the coolant flow conducted through the first housing chamber, and a second valve body, which adjusts the flow rate of the coolant flow conducted through the second housing chamber, are joined to an outer wall of the shaft. With the above-described configuration, by placing the shaft at a predetermined rotational angle, the valve device can adjust the flow rate of the coolant flow conducted in the first path with the first valve body and the flow rate of the coolant flow conducted in the second path with the second valve body.

However, in the above-described valve device, the first valve body and the second valve body are separately joined to the outer wall of the shaft. Therefore, when the joint between the first valve body and the outer wall of the shaft or the joint between the second valve body and the outer wall of the shaft is loosen due to, for example, aging, a positional deviation may possibly occur between the first valve body and the second valve body in the rotational direction. In such a case, a difference may be generated between the flow rate characteristic of the coolant flow conducted in the first path and the flow rate characteristic of the coolant flow conducted in the second path. Therefore, this valve device may have a disadvantage of that the adjustment of the flow rate of the coolant flow conducted in the first path and the adjustment of the flow rate of the coolant flow conducted in the second path cannot be simultaneously and accurately performed.

According to the present disclosure, there is provided a valve device configured to adjust flow rates of a plurality of fluid flows respectively conducted in a plurality of paths. The valve device includes a housing, a valve body, a first passage member, a second passage member and a seal member. The housing has: a first fluid inlet, through which a first fluid flow conducted in a first path enters the housing; a first fluid outlet, through which the first fluid flow exits from the housing; a second fluid inlet, through which a second fluid flow conducted in a second path enters the housing; and a second fluid outlet, through which the second fluid flow exits from the housing. The valve body has: a tubular portion, which is rotatably placed at an inside of the housing; a partition wall which partitions an inside space of the tubular portion into a first valve chamber located on one axial side of the partition wall and a second valve chamber located on another axial side of the partition wall; a primary opening, which is formed at one part of the tubular portion located at the first valve chamber; and a secondary opening, which is formed at another part of the tubular portion located at the second valve chamber. The first passage member is installed to the first fluid inlet or the first fluid outlet and is slidable along an outer wall of the tubular portion of the valve body, wherein the first passage member is configured to communicate with the primary opening when the valve body is placed at a corresponding predetermined rotational angle. The second passage member is installed to the second fluid inlet or the second fluid outlet and is slidable along the outer wall of the tubular portion of the valve body. The second passage member is configured to communicate with the secondary opening when the valve body is placed at a corresponding predetermined rotational angle. The seal member is placed between an inner wall of the housing and the tubular portion of the valve body and extends in a circumferential direction. The seal member partitions an inside space of the housing into a first housing chamber, at which the first fluid inlet and the first fluid outlet are placed, and a second housing chamber, at which the second fluid inlet and the second fluid outlet are placed.

According to the above configuration of the valve device, the seal member, which is placed at the outside of the valve body, partitions the inside space of the housing into the first housing chamber and the second housing chamber. Therefore, in the valve body, the part of the tubular portion, at which the primary opening is formed, and the other part of the tubular portion, at which the secondary opening is formed, can be formed integrally in one piece. Thus, generation of relative positional deviation between the primary opening and the secondary opening in the rotational direction can be limited. As a result, the valve device can simultaneously and accurately perform the adjustment of the flow rate of the first fluid flow and the adjustment of the flow rate of the second fluid flow.

The predetermined rotational angle of the valve body, at which the first passage member and the primary opening are communicated with each other, may be the same as or different from the predetermined rotational angle of the valve body, at which the second passage member and the secondary opening are communicated with each other.

Hereinafter, various embodiments of the present disclosure will be described with reference to the drawings. In the following embodiments, portions, which are the same or equivalent to each other, are indicated by the same reference signs, and description thereof is omitted.

First Embodiment

A first embodiment will be described with reference to the drawings. A valve device 1 of the present embodiment is used in a coolant circuit installed in a vehicle. The valve device 1 is configured to adjust flow rates of a plurality of coolant flows (serving as a plurality of fluid flows) respectively conducted in a plurality of paths of the coolant circuit and change a flow passage of one or more of the coolant flows. In general, a water pump, a water jacket of an internal combustion engine, a radiator, an air conditioning heater core, a transmission oil cooler, an engine oil cooler and the like are installed in the coolant circuit installed in the vehicle. For example, a long life coolant (LLC), which contains ethylene glycol or the like, is used as the coolant that is circulated in the coolant circuit.

In the following description, a first fluid flow, which is conducted in a first path among the plurality of paths of the coolant circuit, will be referred to as a first coolant flow, and a second fluid flow, which is conducted in a second path among the plurality of paths of the coolant circuit, will be referred to as a second coolant flow. There may be a case where the temperature of the first coolant flow and the temperature of the second coolant flow are different from each other.

Figure 1:
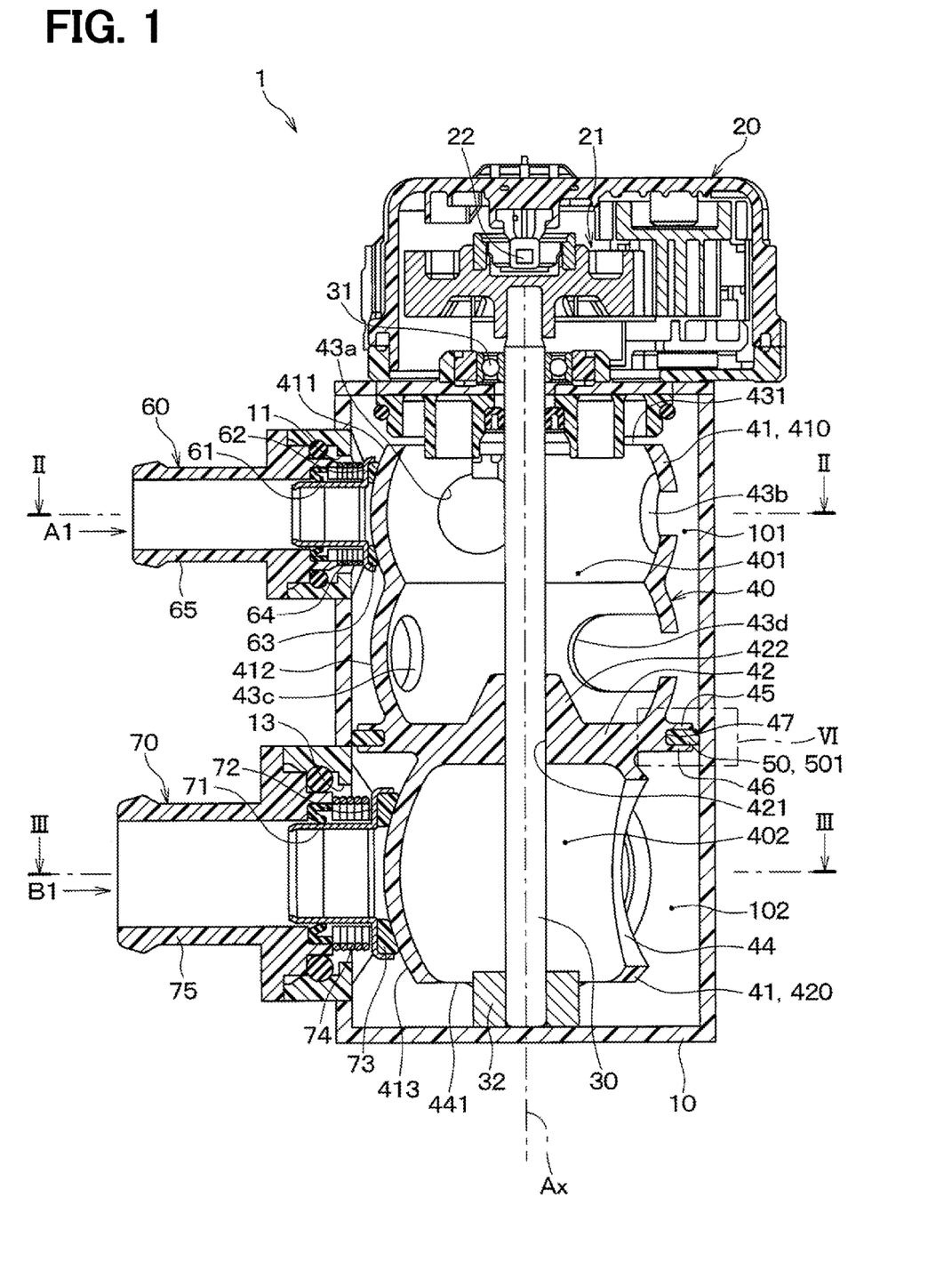
FIG. 1 is a cross-sectional view of a valve device according to a first embodiment.
Figure 2:
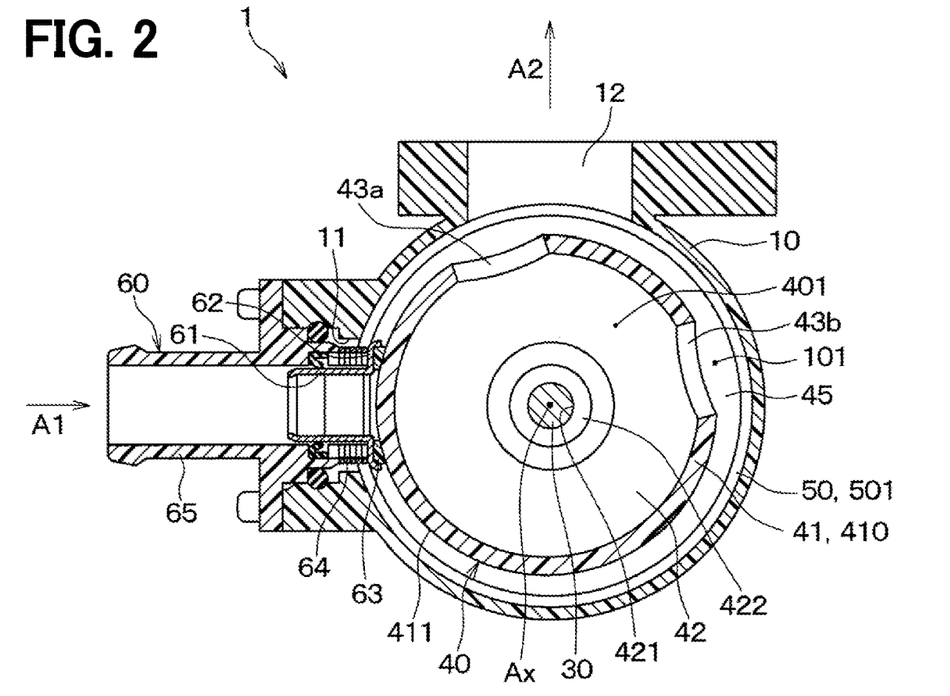
FIG. 2 is a cross-sectional view taken along line II-II in FIG. 1.
Figure 3:
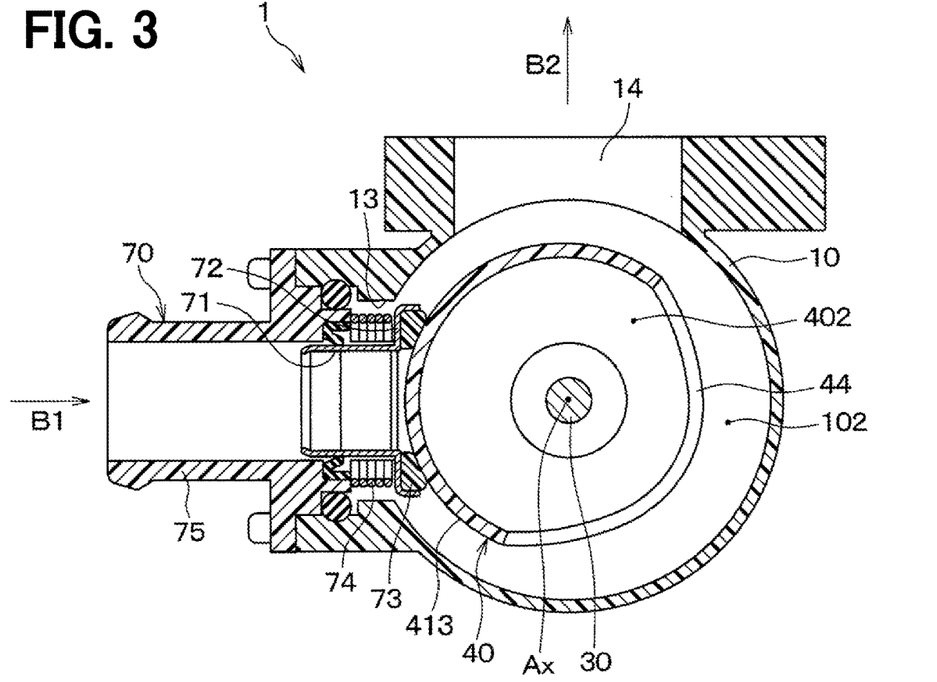
FIG. 3 is a cross-sectional view taken along line III-Ill in FIG. 1.

As shown in FIGS. 1 to 3, the valve device 1 includes a housing 10, a drive device 20, a shaft 30, a valve body 40, a seal member 50, a first passage member 60 and a second passage member 70.

The housing 10 forms an outer shell of the valve device 1. A space, which receives the valve body 40, is formed at an inside of the housing 10. The housing 10 has a first fluid inlet 11, through which the first coolant flow conducted in the first path enters the housing 10, and a first fluid outlet 12, through which the first coolant flow exits from the housing 10. The housing 10 also has a second fluid inlet 13, through which the second fluid flow conducted in the second path enters the housing 10, and a second fluid outlet 14, through which the second fluid flow exits from the housing 10.

The drive device 20, which is configured to rotate the shaft 30, is placed at an outside of the housing 10. The drive device 20 includes an electric motor (not shown) and a gear mechanism 21. The gear mechanism 21 is configured to transmit a torque of the electric motor to the shaft 30. A sensor 22, which is configured to sense a rotational angle of the shaft 30, is installed to the drive device 20.

The shaft 30 is placed at the inside of the housing 10. One end part of the shaft 30 is rotatably supported by a first bearing 31, which is installed to the housing 10 or the drive device 20, and the other end part of the shaft 30 is rotatably supported by a second bearing 32, which is installed to the housing 10. Therefore, the shaft 30 is rotatable about a rotational axis of the shaft 30 relative to the housing 10 and the drive device 20.

The valve body 40 is a so-called ball valve that has an outer wall shaped in a spherical form. The valve body 40 includes a tubular portion 41, a partition wall 42, a plurality of primary openings 43, a secondary opening 44, a first wall 45, a second wall 46 and a groove 47.

The tubular portion 41 is rotatably placed at the inside of the housing 10. A plurality of spherical surfaces 411, 412, 413 is formed at an outer wall of the tubular portion 41 such that a center of a sphere of each of the spherical surfaces 411, 412, 413 is different from a center of a sphere of any of the rest of the spherical surfaces 411, 412, 413. The partition wall 42, which is placed at the inside of the tubular portion 41, partitions an inside space of the tubular portion 41 into a first valve chamber 401 located on one axial side of the partition wall 42 and a second valve chamber 402 located on the other axial side of the partition wall 42. Specifically, the partition wall 42 blocks a flow of the coolant between the first valve chamber 401 and the second valve chamber 402. In the following description, one part of the tubular portion 41, which is located on the first valve chamber 401 side of the partition wall 42, will be referred to a first tubular portion 410, and another part of the tubular portion 41, which is located on the second valve chamber 402 side of the partition wall 42, will be referred to as a second tubular portion 420.

An upper opening 431 is formed at an opposite part of the first tubular portion 410, which is opposite to the partition wall 42 in the axial direction. Furthermore, a lower opening 441 is formed at an opposite part of the second tubular portion 420, which is opposite to the partition wall 42 in the axial direction.

A center portion of the partition wall 42 has a thick wall portion 422 that has a large wall thickness in the axial direction of the rotational axis. The thick wall portion 422 has a through hole 421 that extends through the thick wall portion 422 in the axial direction of the rotational axis. The shaft 30 extends through the through hole 421, which is formed at the thick wall portion 422 of the partition wall 42. An outer wall of the shaft 30 and an inner wall of the through hole 421 are fixed with each other to limit relative rotation between the shaft 30 and the partition wall 42. Furthermore, the first tubular portion 410, the second tubular portion 420 and the partition wall 42 are formed integrally in one piece. Therefore, when the drive device 20 rotates the shaft 30, the shaft 30 and the valve body 40 are rotated together. The rotational axis of the shaft 30 coincides with the rotational axis Ax of the valve body 40.

The primary openings 43, through which the first coolant flow enters into or exits from the first tubular portion 410 of the valve body 40, are formed at a portion of the spherical surface 411 formed at the first tubular portion 410. In the drawings, alphabets a, b, c and d are added to the end of the reference sign 43 that indicates the primary openings. Specifically, the primary openings 43 include the primary openings 43a to 43d. The secondary opening 44, through which the second coolant flow enters into or exits from the second tubular portion 420 of the valve body 40, is formed at a portion of the spherical surface 413 formed at the second tubular portion 420. The positions of the primary openings 43 and the position of the secondary opening 44 change in the rotational direction when the valve body 40 is rotated.

The first wall 45 and the second wall 46 are formed between the first tubular portion 410 and the second tubular portion 420 of the valve body 40 such that the first wall 45 and the second wall 46 outwardly project from the outer wall of the tubular portion 41 in the radial direction. Each of the first wall 45 and the second wall 46 is shaped in a ring form and extends in the circumferential direction of the tubular portion 41, and the first wall 45 and the second wall 46 are parallel to each other. Therefore, the groove 47 is formed between the first wall 45 and the second wall 46. The groove 47 is formed in an annular form that circumferentially extends along the outer wall of the tubular portion 41 of the valve body 40 at a location that is between the first tubular portion 410, which has the primary openings 43, and the second tubular portion 420, which has the secondary opening 44.

The seal member 50 is fitted into the groove 47 that is formed at the tubular portion 41 of the valve body 40. The seal member 50 is placed between the inner wall of the housing 10 and the tubular portion 41 of the valve body 40 and extends in the circumferential direction. The seal member 50 partitions the inside space of the housing 10 into a first housing chamber 101 and a second housing chamber 102. The first fluid inlet 11 and the first fluid outlet 12 are placed at the first housing chamber 101. The second fluid inlet 13 and the second fluid outlet 14 are placed at the second housing chamber 102. The first tubular portion 410 of the valve body 40 is placed at the first housing chamber 101, and the second tubular portion 420 of the valve body 40 is placed at the second housing chamber 102.

Figure 4:
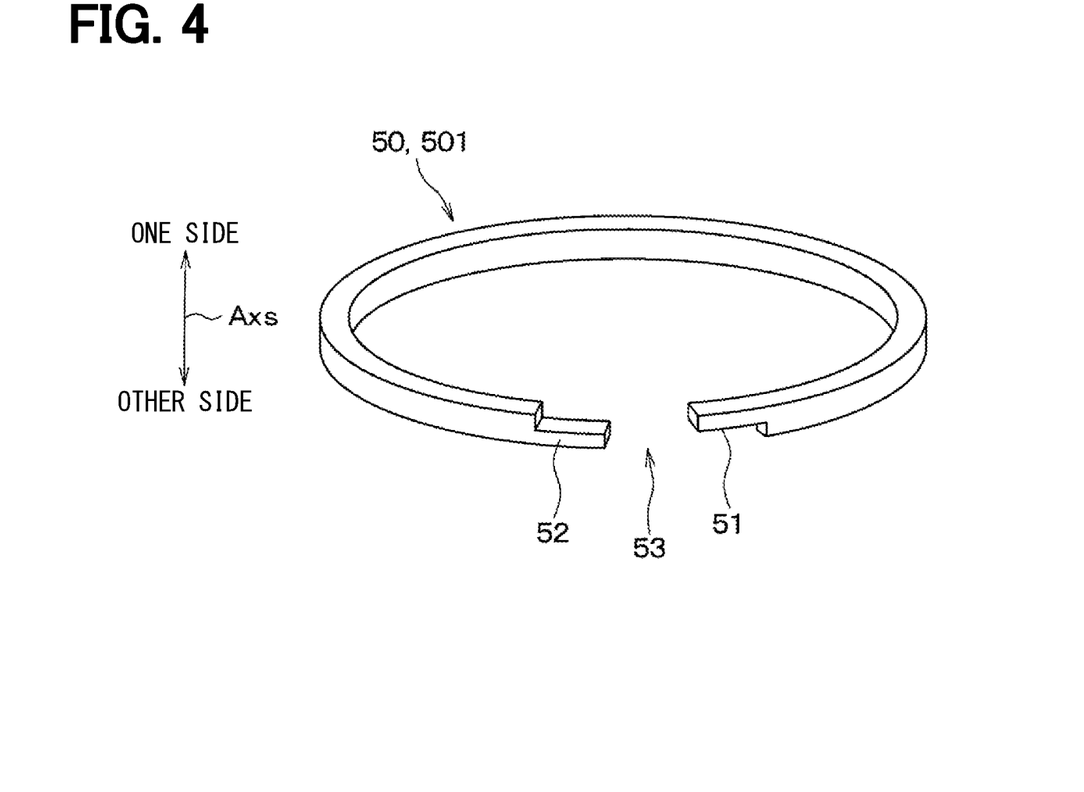
FIG. 4 is a perspective view of a seal ring of the valve device according to the first embodiment.
Figure 5:
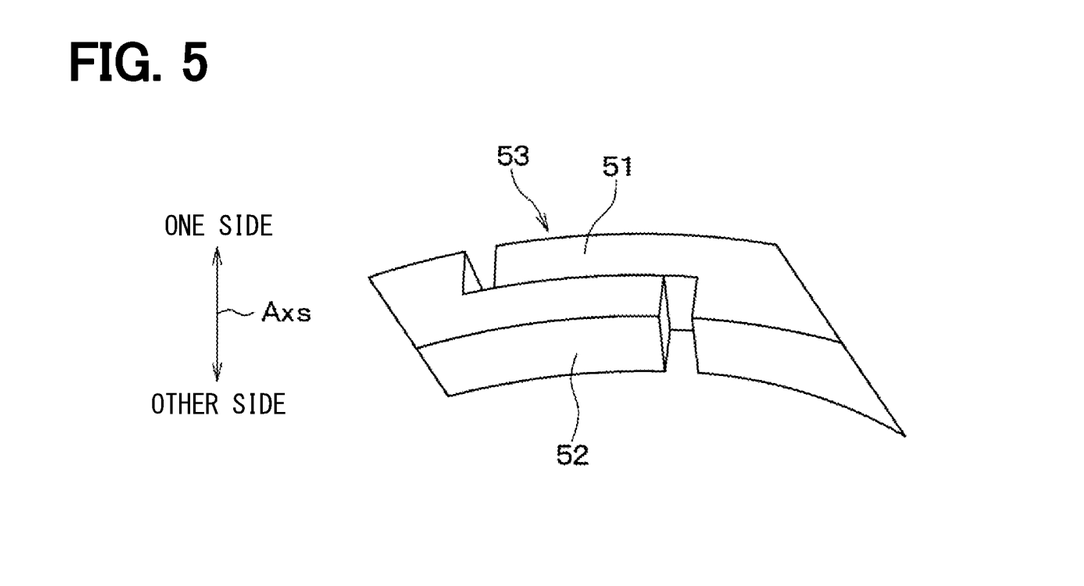
FIG. 5 is a perspective view of an end gap part of the seal ring of the valve device according to the first embodiment.

As shown in FIG. 4, the seal member 50 of the present embodiment is a seal ring 501 that is shaped in a ring form and has an end gap part 53, at which one end part (more specifically, one circumferential end part) 51 and another end part (more specifically, another circumferential end part) 52 of the seal ring 501 are opposed to each other. FIG. 4 shows a state where the end gap part 53 of the seal ring 501 is increased in the circumferential direction. FIG. 5 shows another state where the end gap part 53 of the seal ring 501 is closed.

In FIGS. 4 and 5, the axial direction of the seal ring 501 is indicated by an arrow Axs. In the state where the seal ring 501 is fitted into the groove 47 of the valve body 40, the axial direction Axs of the seal ring 501 substantially coincides with the rotational axis Ax of the valve body 40.

As shown in FIG. 5, when the seal ring 501 is fitted into the groove 47 of the valve body 40, the seal ring 501 is placed in the state where the end gap part 53 of the seal ring 501 is closed. The end gap part 53 of the seal ring 501 of the present embodiment is shaped in a form of step-cut where the one end part 51 and the other end part 52 of the seal ring 501, which form the end gap part 53, overlap with each other in a view taken in the axial direction of the seal ring 501.

Specifically, the one end part 51 and the other end part 52 of the seal ring 501, which form the end gap part 53, both have an axial thickness that is measured in the axial direction of the seal ring 501 and is about one half of a thickness of a main body portion of the seal ring 501 measured in the axial direction of the seal ring 501. Here, the main body of the seal ring 501 refers to a portion of the seal ring 501 that is other than the one end part 51 and the other end part 52 of the seal ring 501. The one end part 51 of the seal ring 501 is located on one side in the axial direction of the seal ring 501, and the other end part 52 of the seal ring 501 is located on the other side in the axial direction of the seal ring 501. The one end part 51 and the other end part 52 of the seal ring 501, which form the end gap part 53, are configured to overlap with each other in the view taken in the axial direction of the seal ring 501.

The seal ring 501 of the present embodiment is made of: metal; resin; ceramic; or a combination of at least two of the meal, the resin and the ceramic.

As shown in FIGS. 1 and 2, a first passage member 60 is installed at the first fluid inlet 11 of the housing 10. The first passage member 60 includes a first pipe 65, a first sleeve 61, a first seat member 63 and a first spring 64. The first pipe 65 is fixed to the outer wall of the housing 10. A hose (not shown) or the like, which forms the first path, is joined to the first pipe 65. Therefore, as indicated by an arrow A1, the first coolant flow, which is conducted in the first path, enters the first pipe 65.

The first sleeve 61 is installed at an inside of the first pipe 65. The first sleeve 61 is a tubular member and is slidably supported by an inner wall of the first pipe 65. The first sleeve 61 has a first flange 62 that is formed at the valve body 40 side end of the first sleeve 61 and is configured to support the first seat member 63.

The first seat member 63 is placed between the first flange 62 of the first sleeve 61 and the outer wall of the first tubular portion 410 of the valve body 40. The first seat member 63 is shaped in a ring form and slidably contacts the spherical surface 411 that is formed at the outer wall of the first tubular portion 410 of the valve body 40. The first spring 64 is placed between the first flange 62 and the first pipe 65. The first spring 64 urges the first sleeve 61 and the first seat member 63 toward the valve body 40. In this way, the first seat member 63 tightly contacts the outer wall of the first tubular portion 410 of the valve body 40.

Furthermore, as shown in FIGS. 1 and 3, the second passage member 70 is installed at the second fluid inlet 13 of the housing 10. The second passage member 70 includes a second pipe 75, a second sleeve 71, a second seat member 73 and a second spring 74. The second pipe 75 is fixed to the outer wall of the housing 10. A hose (not shown) or the like, which forms the second path, is joined to the second pipe 75. Therefore, as indicated by an arrow B1, the second coolant flow, which is conducted in the second path, enters the second pipe 75.

The second sleeve 71 is installed at an inside of the second pipe 75. The second seat member 73 is placed between a second flange 72 of the second sleeve 71 and the spherical surface 413 formed at the outer wall of the second tubular portion 420 of the valve body 40. Furthermore, the second spring 74 is placed between the second flange 72 and the second pipe 75. The structures of the second sleeve 71, the second seat member 73 and the second spring 74 are substantially the same as the structures of the first sleeve 61, the first seat member 63 and the first spring 64, respectively.

FIGS. 1 to 3 show a state where a position of the first passage member 60, which is installed to the first fluid inlet 11 of the housing 10, overlaps with the outer wall of the first tubular portion 410 of the valve body 40 in a direction that is perpendicular to the rotational axis Ax. Also, FIGS. 1 to 3 show a state where a position of the second passage member 70, which is installed to the second fluid inlet 13 of the housing 10, overlaps with the outer wall of the second tubular portion 420 of the valve body 40 in a direction that is perpendicular to the rotational axis Ax.

Specifically, the position of the first passage member 60, which is installed to the first fluid inlet 11 of the housing 10, does not overlap with the positions of the primary openings 43 of the valve body 40 in the direction perpendicular to the rotational axis Ax. Furthermore, the position of the second passage member 70, which is installed to the second fluid inlet 13 of the housing 10, does not overlap with the position of the secondary opening 44 of the valve body 40 in the direction perpendicular to the rotational axis Ax.

In this state, the first coolant flow in the first path is blocked by the outer wall of the first tubular portion 410 of the valve body 40, and the second coolant flow in the second path is blocked by the outer wall of the second tubular portion 420 of the valve body 40.

In contrast, although not shown in the drawings, when the valve body 40 is rotated from the state shown in FIGS. 1 to 3 and is placed at a predetermined rotational angle, the position of the first passage member 60 and the position of the primary opening 43a or 43b of the valve body 40 overlap with each other in the direction that is perpendicular to the rotational axis Ax. In this state, the first passage member 60 and the primary opening 43 (more specifically, the primary opening 43a or 43b) of the valve body 40 are communicated with each other. Therefore, the first coolant flow of the first path enters from the first passage member 60 into the first valve chamber 401 through the primary opening 43 (more specifically, the primary opening 43a or 43b). Then, the first coolant flow enters from the upper opening 431 of the first valve chamber 401 into the first housing chamber 101 located at the outside of the valve body 40 and exits from the first fluid outlet 12, as indicated by an arrow A2.

Furthermore, although not depicted in the drawings, when the valve body 40 is rotated from the state shown in FIGS. 1 to 3 and is placed at the predetermined rotational angle, the position of the second passage member 70 and the position of the secondary opening 44 of the valve body 40 overlap with each other in the direction perpendicular to the rotational axis Ax. In this state, the second passage member 70 and the secondary opening 44 of the valve body 40 are communicated with each other. Therefore, the second coolant flow of the second path enters from the second passage member 70 into the second valve chamber 402 through the secondary opening 44. Then, the second coolant flow enters from the lower opening 441 of the second valve chamber 402 into the second housing chamber 102 located at the outside of the valve body 40 and exits from the second fluid outlet 14, as indicated by an arrow B2.

The predetermined rotational angle of the valve body 40, at which the first passage member 60 and the primary opening 43a or 43b are communicated with each other, may be the same as or different from the predetermined rotational angle of the valve body 40, at which the second passage member 70 and the secondary opening 44 are communicated with each other. The predetermined rotational angle(s) is set according to the specification of the coolant circuit, at which the valve device 1 is used.

Figure 6:
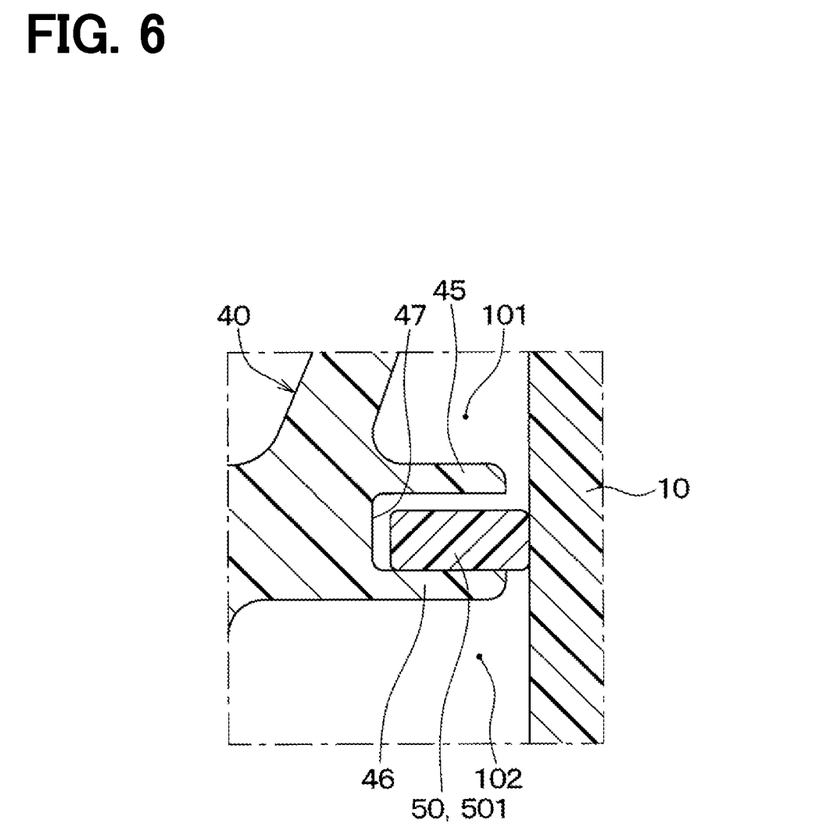
FIG. 6 is an enlarged view of an area VI in FIG. 1, showing a state where a fluid pressure in a first housing chamber is higher than a fluid pressure in a second housing chamber.

FIG. 6 is an enlarged view of an area VI in FIG. 1, showing a state where the pressure of the first coolant flow conducted in the first housing chamber 101 is higher than the pressure of the second coolant flow conducted in the second housing chamber 102. At this time, the seal ring 501 is urged against the inner wall of the second wall 46, which forms the groove 47, by the differential pressure between the pressure of the first coolant flow and the pressure of the second coolant flow. Furthermore, the seal ring 501 is urged against the inner wall of the housing 10 by the pressure of the first coolant flow, which enters a gap formed between a bottom of the groove 47 and a radially inner surface of the seal member 50. As described above, the seal ring 501 can limit the flow of the coolant between the first housing chamber 101 and the second housing chamber 102 by a so-called self-sealing function.

Furthermore, although not depicted in the drawings, when the pressure of the second coolant flow, which is conducted in the second housing chamber 102, is higher than the pressure of the first coolant flow, which is conducted the first housing chamber 101, the seal ring 501 is urged against the inner wall of the first wall 45, which forms the groove 47. Furthermore, the seal ring 501 is urged against the inner wall of the housing 10 by the pressure of the second coolant flow, which enters the gap formed between the bottom of the groove 47 and the radially inner surface of the seal member 50. Even in this case, the seal ring 501 can limit the flow of the coolant between the first housing chamber 101 and the second housing chamber 102 by the self-sealing function.

The valve device 1 of the present embodiment described above provides the following effects and advantages.

(1) In the valve device 1 of the present embodiment, the seal ring 501, which is installed to the outer wall of the valve body 40 partitions the inside space of the housing 10 into the first housing chamber 101 and the second housing chamber 102. Therefore, the valve body 40 can be formed such that the first tubular portion 410 and the second tubular portion 420 are formed integrally in one piece. Thus, it is possible to limit a deviation in the relative position between each of the primary openings 43 of the first tubular portion 410 and the secondary opening 44 of the second tubular portion 420 in the rotational direction. As a result, the flow rate adjustment of the first coolant flow and the flow rate adjustment of the second coolant flow can be simultaneously and correctly performed by the valve device 1.

(2) In the present embodiment, the valve body 40 includes the first tubular portion 410, the second tubular portion 420 and the partition wall 42, which are formed integrally in one piece, and this valve body 40 is fixed to the shaft 30. In this way, it is possible to limit the deviation in the relative position between each of the primary openings 43 of the first tubular portion 410 and the secondary opening 44 of the second tubular portion 420 in the rotational direction.

(3) In the valve device 1 of the present embodiment, the seal ring 501 is fitted into the groove 47 formed at the outer wall of the tubular portion 41 of the valve body 40. Thereby, the seal ring 501 is urged against one of the opposed inner walls of the groove 47 by the differential pressure between the pressure of the first coolant flow, which is conducted in the first housing chamber 101, and the pressure of the second coolant flow, which is conducted in the second housing chamber 102. Furthermore, the seal ring 501 is urged against the inner wall of the housing 10 by the pressure of the coolant, which enters the gap formed between the bottom of the groove 47 and the radially inner surface of the seal ring 501. As described above, the seal ring 501 can limit the flow of the coolant between the first housing chamber 101 and the second housing chamber 102 by the self-sealing function.

(4) In the present embodiment, the seal ring 501 has the end gap part 53 at the location where the one end part 51 and the other end part 52 of the seal ring 501 are opposed to each other. Thereby, the seal ring 501 can absorb a dimensional tolerance of the inner wall of the housing 10 by the end gap part 53. Thus, it is possible to reduce the frictional resistance when the seal ring 501 and the inner wall of the housing 10 are slid relative to each other. As a result, the valve device 1 enables a reduction in the drive force required to rotate the valve body 40 and also enables easy rotation of the valve body 40.

(5) In the present embodiment, the end gap part 53 of the seal ring 501 is shaped in the form of step-cut. The step-cut is the form where the one end part 51 and the other end part 52 of the seal ring 501, which form the end gap part 53, overlap with each other in the view taken in the axial direction of the seal ring 501. Thereby, the one end part 51 and the other end part 52 of the seal ring 501, which form the end gap part 53, tightly contact with each other in the axial direction of the seal ring 501 due to the differential pressure between the pressure of the first coolant flow, which is conducted in the first housing chamber 101, and the pressure of the second coolant flow, which is conducted in the second housing chamber 102. Thus, the seal ring 501 can limit the flow of the coolant between the first housing chamber 101 and the second housing chamber 102 through the end gap part 53.

(6) In the present embodiment, the seal ring 501 is made of: the metal; the resin; the ceramic; or the combination of at least two of the meal, the resin and the ceramic. Thereby, the wear resistance of the seal ring 501 is improved, and deterioration of the seal ring 501 over time can be limited. Therefore, even when the LLC or the like is used as the fluid, the sealing performance can be ensured for a long time.

Second to Fourth Embodiments

Figure 7:
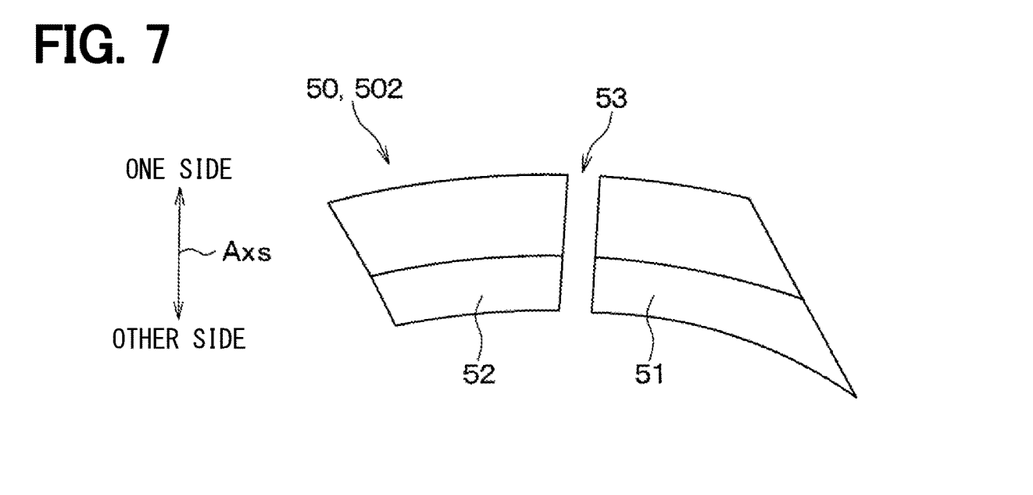
FIG. 7 is a perspective view of an end gap part of a seal ring of a valve device according to a second embodiment.
Figure 8:
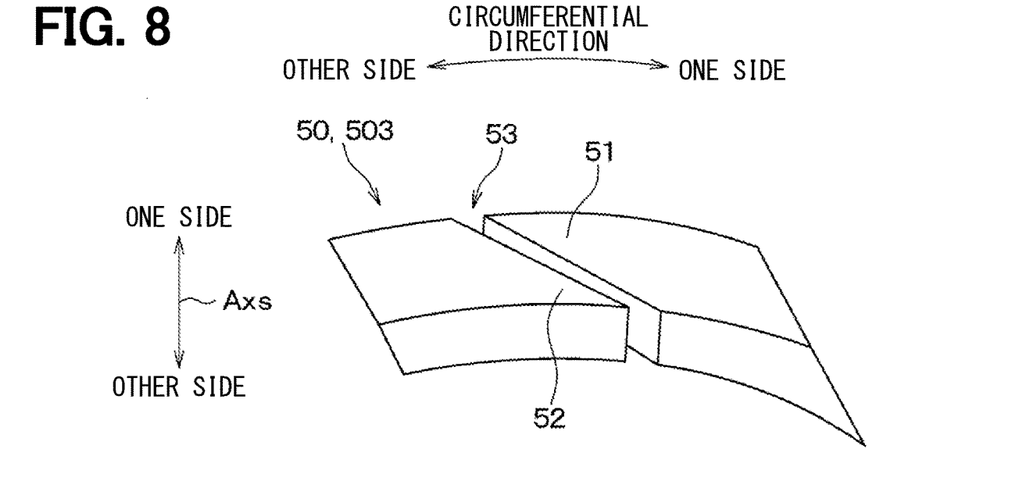
FIG. 8 is a perspective view of an end gap part of a seal ring of a valve device according to a third embodiment.
Figure 9:
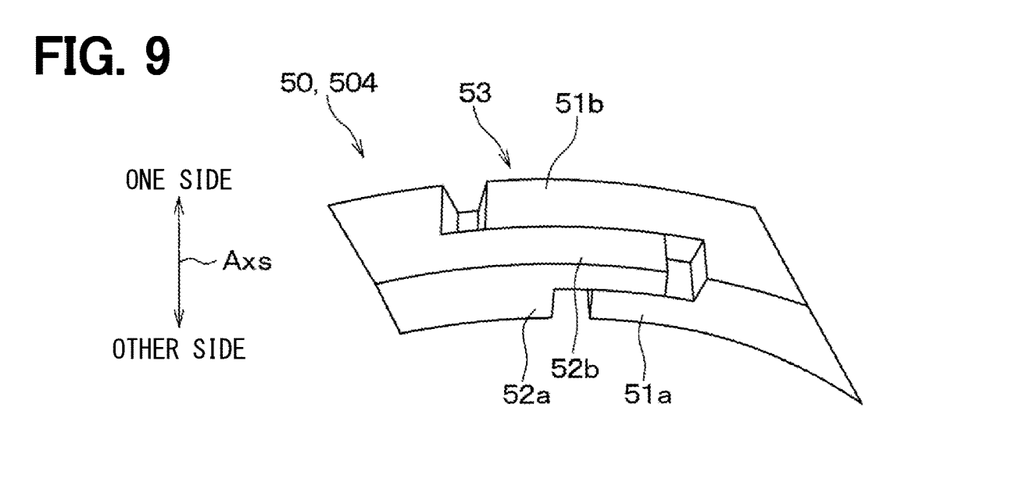
FIG. 9 is a perspective view of an end gap part of a seal ring of a valve device according to a fourth embodiment.

Now, second to fourth embodiments will be described. The second to fourth embodiments are modifications of the first embodiment where the structure of the end gap part 53 of the seal ring is changed, and the rest of the structure of each of the second to fourth embodiments is the same as that of the first embodiment. Therefore, in the following discussion, only the difference, which is different from the first embodiment, will be described. FIGS. 7 to 9 of the second to fourth embodiments indicate the end gap part 53 of the seal ring and its adjacent area.

Second Embodiment

As shown in FIG. 7, according to the second embodiment, the end gap part 53 of the seal ring 502 of the valve device 1 is not in the form of step-cut. The one end part 51 and the other end part 52 of the seal ring 502, which form the end gap part 53, are configured to oppose each other while a predetermined gap is formed between the one end part 51 and the other end part 52 of the seal ring 502. A size of the gap of the end gap part 53 of the seal ring 502 is set such that a degree of mixing of the first coolant flow, which is conducted in the first housing chamber 101, and the second coolant flow, which is conducted in the second housing chamber 102, is within an allowable range of the coolant circuit.

Even in the second embodiment discussed above, similar to the first embodiment, the seal ring 502 can absorb a dimensional tolerance of the inner wall of the housing 10 by the end gap part 53. Thus, it is possible to reduce the frictional resistance when the seal ring 502 and the inner wall of the housing 10 are slid relative to each other. As a result, the valve device 1 enables a reduction in the drive force required to rotate the valve body 40 and also enables easy rotation of the valve body 40.

Third Embodiment

As shown in FIG. 8, according to the third embodiment, the end gap part 53 of the seal ring 503 of the valve device 1 is in a form of step-cut. In the third embodiment, the one end part 51 and the other end part 52 of the seal ring 503, which form the end gap part 53, are respectively configured such that an axial thickness of the circumferential end part 51, 52 is progressively reduced from the main body portion of the seal ring 503 toward a tip end of the circumferential end part 51, 52. Specifically, the one end part 51 of the seal ring 503, which forms the end gap part 53, has a tilt surface that circumferentially extends from the one circumferential side toward the other side and is tilted from the other axial side toward the one axial side. Furthermore, the other end part 52 of the seal ring 503, which forms the end gap part 53, has a tilt surface that circumferentially extends from one circumferential side to the other circumferential side and is tilted from the one axial side to the other axial side. The tilt surface, which is formed at the one end part 51 of the seal ring 503, and the tilt surface, which is formed at the other end part 52, overlap with each other in the view taken in the axial direction of the seal ring 503.

Even in the third embodiment described above, the effects and advantages, which are similar to those of the first embodiment, can be achieved.

Fourth Embodiment

As shown in FIG. 9, the seal ring 504 of the valve device 1 of the fourth embodiment is a combination of the seal ring of the first embodiment and the seal ring of the second embodiment. Specifically, according to the fourth embodiment, a radially inner side portion of the seal ring 504 is configured such that one end part 51a and the other end part 52a of the seal ring 504, which form the end gap part 53, are opposed to each other while the predetermined gap is formed between the one end part 51a and the other end part 52a. The radially inner side portion of the seal ring 504 is a portion that is received in the groove 47 of the valve body 40.

In contrast, like in the first embodiment, the radially outer side portion of the seal ring 504 is configured such that one end part 51b and the other end part 52b of the seal ring 504, which form the end gap part 53, overlap with each other in the view taken in the axial direction of the seal ring 504.

Even in the fourth embodiment described above, the effects and advantages, which are similar to those of the first embodiment, can be achieved.

Fifth to Seventh Embodiments

The fifth to seventh embodiments will be described. The fifth to seventh embodiments are different from the first embodiment with respect to that the seal member 50 is made of elastic rubber, and the rest of the structure of the fifth to seventh embodiments are similar to that of the first embodiment. Therefore, in the following discussion, only the different portion of the fifth to seventh embodiments will be described.

Figure 10:
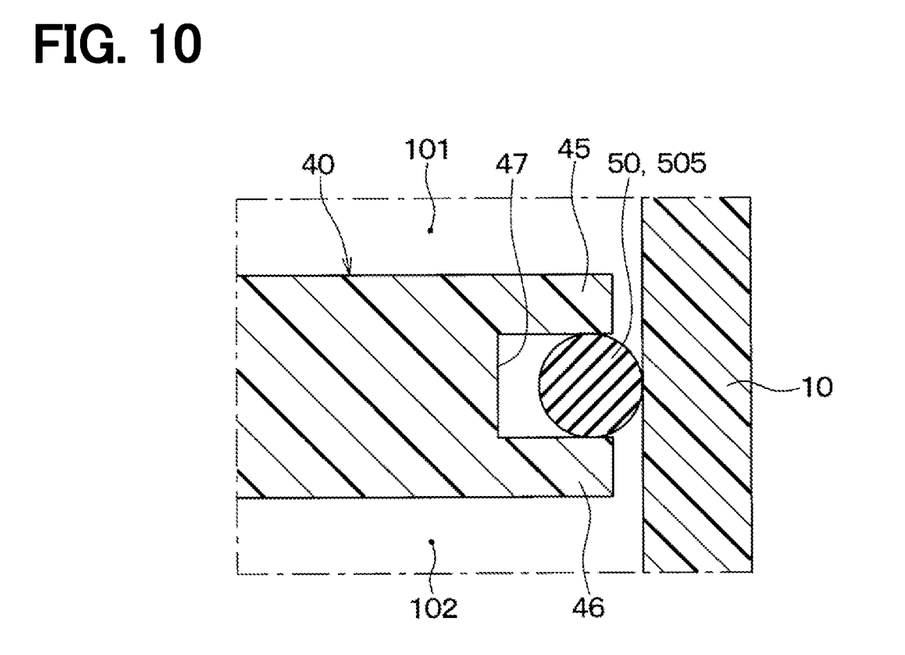
FIG. 10 is an enlarged view of an area of a valve device of a fifth embodiment, which corresponds to the area VI in FIG. 1.
Figure 11:
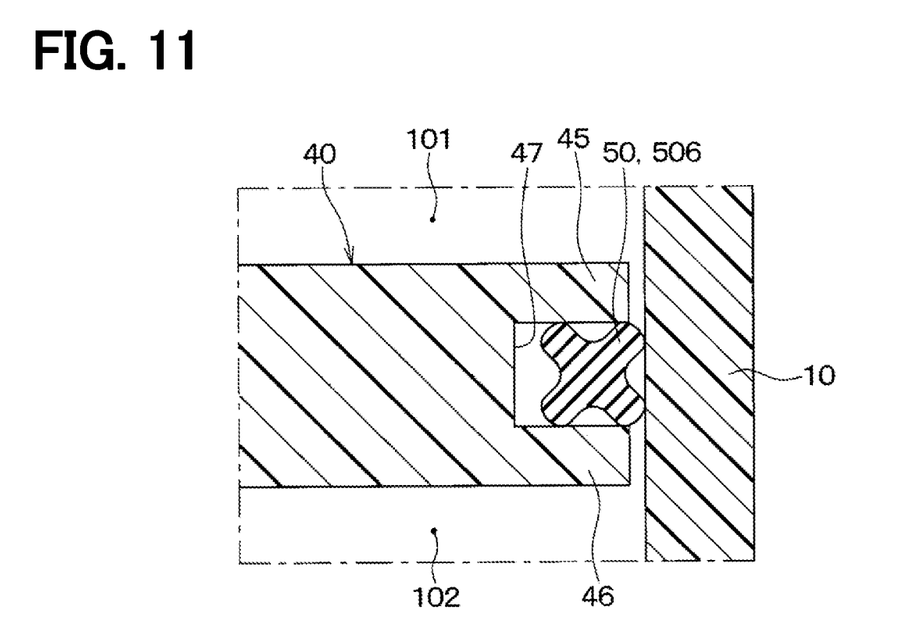
FIG. 11 is an enlarged view of an area of a valve device of a sixth embodiment, which corresponds to the area VI in FIG. 1.
Figure 12:
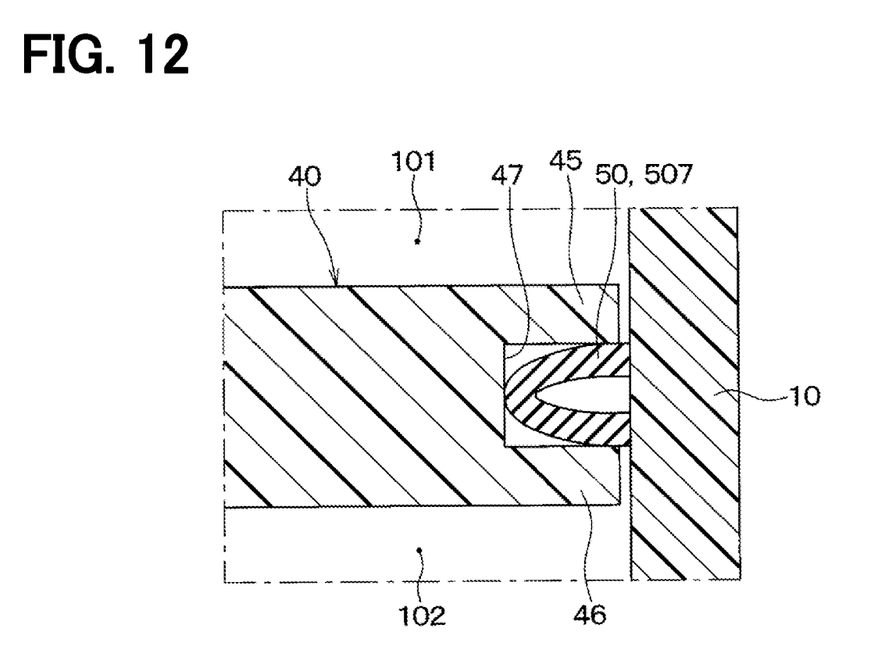
FIG. 12 is an enlarged view of an area of a valve device of a seventh embodiment, which corresponds to the area VI in FIG. 1.

FIGS. 10 to 12 of the fifth to seventh embodiments show a cross section of the seal member 50 and its adjacent region at an area VI shown in FIG. 1. The seal member 50 of the valve device 1 of the fifth to seventh embodiments does not have the end gap part 53 and is formed continuously and seamlessly in one piece.

Fifth Embodiment

As shown in FIG. 10, the seal member 50 of the valve device 1 of the fifth embodiment is an O-ring 505 that has a cross section shaped generally in a circular shape. The O-ring 505 closely contacts the inner wall of the groove 47 of the valve body 40 and the inner wall of the housing 10 by its own elastic force. Therefore, the O-ring 505 can limit the flow of the coolant between the first housing chamber 101 and the second housing chamber 102.

Sixth Embodiment

As shown in FIG. 11, the seal member 50 of the valve device 1 of the sixth embodiment has a cross section shaped generally in an X-shape and is thereby known as an X-ring 506. The X-ring 506 closely contacts the inner wall of the groove 47 of the valve body 40 and the inner wall of the housing 10 by its own elastic force. Furthermore, the X-ring 506 is configured to be urged against the inner wall of the housing 10 by the pressure of the coolant that enters a gap between the inner wall of the groove 47 and the X-ring 506. Therefore, the X-ring 506 can more reliably limit the flow of the coolant between the first housing chamber 101 and the second housing chamber 102.

Seventh Embodiment

As shown in FIG. 12, the seal member 50 of the valve device 1 of the seventh embodiment is a so-called V-ring 507 that has a cross section shaped generally in a V-shape. The V-ring 507 closely contacts the inner wall of the groove 47 of the valve body 40 and the inner wall of the housing 10 by its own elastic force. Furthermore, the V-ring 507 is configured to be urged against the inner wall of the housing 10 by the pressure of the coolant that enters a gap between the inner wall of the groove 47 and the V-ring 507. Therefore, the V-ring 507 can more reliably limit the flow of the coolant between the first housing chamber 101 and the second housing chamber 102.

In the fifth to seventh embodiments described above, the sealing performance of the seal member 50 can be improved by forming the seal member 50 from the elastic rubber.

Other Embodiments

The present disclosure should not be limited to the embodiments described above and may be appropriately modified within the scope of the present disclosure. In addition, the above embodiments are not irrelevant to each other and may be appropriately combined unless a combination is clearly not possible. In each of the above embodiments, it is needless to say that the elements constituting the embodiment are not necessarily essential, unless otherwise clearly indicated as essential or in principle considered to be clearly essential. In each of the above embodiments, when a value, such as a number, a numerical value, an amount, a range or the like of the constituent elements of the exemplary embodiment is mentioned, the present disclosure should not be limited to such a value unless it is clearly stated that it is essential and/or it is required in principle. In each of the above embodiments, for example, when referring to the shape of components and/or the positional relationship of the components, the present disclosure should not be limited to such a shape and positional relationship unless it is clearly stated that it is essential and/or it is required in principle.

(1) In each of the above embodiments, the valve device 1 is used in the coolant circuit installed at the vehicle. However, the application of the valve device 1 should not be limited to this one. The valve device 1 of the present disclosure may be used in various circuits that circulate fluid such as oil or refrigerant.

(2) In each of the above embodiments, the valve device 1 has both the function of adjusting the flow rates of the coolant flows (serving as the fluid flows) and the function of changing the flow passage of one or more of the coolant flows. However, the function(s) of the valve device 1 should not be limited to these functions. It is only required that the valve device 1 has at least one of the function of adjusting the flow rates of the fluid flows and the function of changing the flow passage of one or more of the fluid flows.

(3) In the above embodiments, the valve device 1 is configured such that the seal member 50 is fitted to the groove 47 that is formed at the outer wall of the valve body 40. However, the present disclosure should not be limited to this. For example, the valve device 1 may be configured such that the groove 47 is formed at the inner wall of the housing 10, and the seal member 50 is fitted to this groove 47. In such a case, the first wall 45 and the second wall 46, each of which is shaped in a ring form, may inwardly project from the inner wall of the housing 10 in the radial direction, and the seal member 50 may be fitted to the groove 47 formed between the first wall 45 and the second wall 46. In this case, the radially inner surface of the seal member 50 is configured to slidably contact the outer wall of the valve body 40.

In the above embodiments, the valve device 1 is configured such that the first passage member 60 is installed to the first fluid inlet 11 of the housing 10, and the second passage member 70 is installed to the second fluid inlet 13 of the housing 10. However, the configuration of the valve device 1 should not be limited to this configuration. For example, the valve device 1 may be configured such that the first passage member 60 is installed to the first fluid outlet 12 of the housing 10, and the second passage member 70 is installed to the second fluid outlet 14 of the housing 10.

What is claimed is:

1. A valve device configured to adjust flow rates of a plurality of fluid flows respectively conducted in a plurality of paths, comprising:
    a housing that has:
        a first fluid inlet, through which a first fluid flow conducted in a first path enters the housing;
        a first fluid outlet, through which the first fluid flow exits from the housing;
        a second fluid inlet, through which a second fluid flow conducted in a second path enters the housing; and
        a second fluid outlet, through which the second fluid flow exits from the housing;
    a valve body that has:
        a tubular portion, which is rotatably placed at an inside of the housing;
        a partition wall, which partitions an inside space of the tubular portion into a first valve chamber located on one axial side of the partition wall and a second valve chamber located on another axial side of the partition wall;
        a primary opening, which is formed at one part of the tubular portion located at the first valve chamber; and
        a secondary opening, which is formed at another part of the tubular portion located at the second valve chamber;
    a first passage member that is installed to the first fluid inlet or the first fluid outlet and is slidable along an outer wall of the tubular portion of the valve body, wherein the first passage member is configured to communicate with the primary opening when the valve body is placed at a corresponding predetermined rotational angle;
    a second passage member that is installed to the second fluid inlet or the second fluid outlet and is slidable along the outer wall of the tubular portion of the valve body, wherein the second passage member is configured to communicate with the secondary opening when the valve body is placed at a corresponding predetermined rotational angle;
    a seal member that is placed between an inner wall of the housing and the tubular portion of the valve body and extends in a circumferential direction, wherein the seal member partitions an inside space of the housing into a first housing chamber, at which the first fluid inlet and the first fluid outlet are placed, and a second housing chamber, at which the second fluid inlet and the second fluid outlet are placed; and
    a shaft that is rotatable together with the valve body about an axis relative to the housing and extends through the partition wall in an axial direction of the axis.

2. The valve device according to claim 1, wherein the one part of the tubular portion, at which the primary opening is formed, the another part of the tubular portion, at which the secondary opening is formed, and the partition wall are formed integrally in one piece at the valve body, and the valve body is fixed to the shaft.

3. The valve device according to claim 1, wherein:
    the valve body further includes a groove that is shaped in a ring form and circumferentially extends along the outer wall of the tubular portion while the groove is located between the one part of the tubular portion, at which the primary opening is formed, and the another part of the tubular portion, at which the secondary opening is formed; and
    the seal member is fitted into the groove.

4. The valve device according to claim 1, wherein the seal member is a seal ring that is shaped in a ring form and has an end gap part, at which one circumferential end part and another circumferential end part of the seal ring are opposed to each other.

5. The valve device according to claim 4, wherein the end gap part of the seal ring is in a form of step-cut where the one circumferential end part and the another circumferential end part of the seal ring, which form the end gap part, overlap with each other in a view taken in an axial direction of the seal ring.

6. The valve device according to claim 4, wherein the seal ring is made of:
    metal;
    resin;
    ceramic; or
    a combination of at least two of the meal, the resin and the ceramic.

7. The valve device according to claim 1, wherein the seal member is made of elastic rubber.

8. The valve device according to claim 1, wherein in a longitudinal cross section of the tubular portion that is taken along a plane, along which the axis extends, each of an outer peripheral surface of the one part and an outer peripheral surface of the another part of the tubular portion is outwardly curved relative to the axis.

\* \* \* \* \*